United States Patent [19]

Kato et al.

[11] Patent Number: 4,631,981

[45] Date of Patent: Dec. 30, 1986

[54] MACHINE TOOL WITH TWO TOOL CHANGERS

[75] Inventors: Noboru Kato, Tsushima; Yasuhiro Hattori, Kariya, both of Japan

[73] Assignee: Toyoda Koki Kabushiki Kaisha, Kariya, Japan

[21] Appl. No.: 673,939

[22] Filed: Nov. 21, 1984

[30] Foreign Application Priority Data

Nov. 21, 1983 [JP] Japan ................. 58-219287

[51] Int. Cl.$^4$ .......................................... B23B 29/24
[52] U.S. Cl. ................................. 74/813 R; 74/825; 29/568
[58] Field of Search ............... 74/813 R, 825; 29/568

[56] References Cited

U.S. PATENT DOCUMENTS

| | | | |
|---|---|---|---|
| 3,760,490 | 9/1973 | Burg | 29/568 |
| 3,817,391 | 6/1974 | Lohneis | 29/568 X |
| 4,087,901 | 5/1978 | Lohneis | 29/568 |
| 4,164,809 | 8/1979 | Tsuboi | 29/568 |
| 4,288,909 | 9/1981 | Kielma | 29/568 |
| 4,402,125 | 9/1983 | Carroll | 29/568 |

*Primary Examiner*—Harold W. Weakley
*Attorney, Agent, or Firm*—Oblon, Fisher, Spivak, McClelland, & Maier

[57] ABSTRACT

A machine tool having a tool spindle rotatable about a horizontal axis provided with first and second tool magazines and first and second tool transfer devices. The first tool magazine removably stores a plurality of small diameter tools, with the axes of the small diameter tools extending horizontally. The first tool transfer device transfers the small diameter tools between the first tool magazine and the tool spindle. The second tool magazine is installed on the floor at one side of a column of the machine tool in a horizontal direction perpendicular to the tool spindle and removably stores a plurality of large diameter tools, with the axes of the large diameter tools extending vertically. The second tool magazine is provided with a turnover mechanism, which pivotally moves a large diameter tool indexed to a large tool removal position so as to lay the large diameter tool horizontally in parallel relation with the tool spindle. The second transfer device is movable between the large tool removal position and the tool spindle so that a new large tool is removed from the second tool magazine at the large tool removal position to be inserted into the tool spindle, while a used large tool is taken out from the tool spindle to be returned to the second tool magazine at the large tool removal position.

5 Claims, 9 Drawing Figures

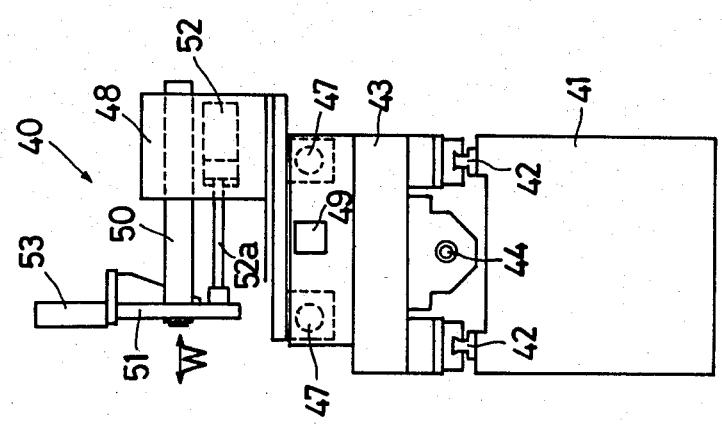
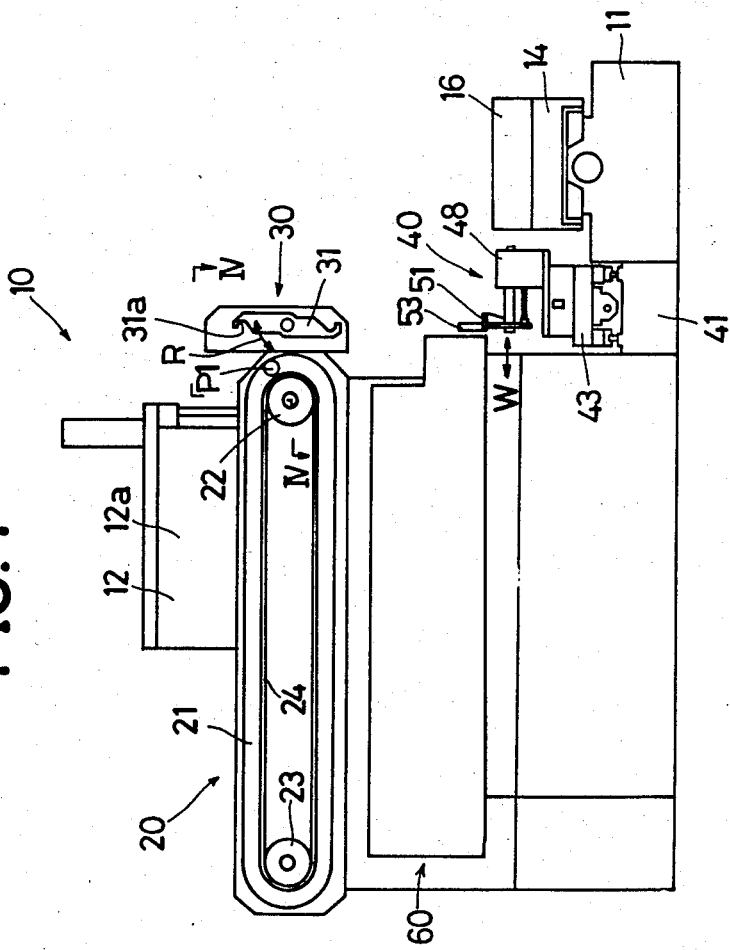

MACHINE TOOL WITH TWO TOOL CHANGERS

BACKGROUND OF THE INVENTION

1. Field of the Invention

The present invention relates to a machine tool having an automatic tool changer for cutting tools.

2. Description of the Prior Art

In a known machine tool with an automatic tool changer, a spindle head in which a tool spindle for removably receiving a tool is carried for rotation about a horizontal axis is vertically movable along an upstanding column mounted on a bed, and a table for mounting a workpiece is provided to face the spindle head with a space. A tool magazine for storing a plurality of small diameter tools which are selectively indexable to a tool removal position is installed at one side of the column in a horizontal direction transverse to the tool spindle. The machine tool is further provided with a tool change unit for changing the tools between the tool magazine and the tool spindle. In the machine tool of this type, it is difficult for the following reasons to store large diameter tools in the tool magazine.

(1) Restraint is imposed on the diameters of tools storable in the tool magazine due to the fact that the pitch of tool sockets which are provided in a side-by-side relation for storage of tools is relatively small.

(2) If the tool sockets horizontally store heavy tools at their tapered receiving bores, the heavy tools may fall off the tool sockets although a mechanism for preventing such tool from falling is usually provided.

Further, the tool change unit uses a tool exchange arm which, when rotated for tool exchange, causes a centrifugal force to act upon each of tools held thereby. Such centrifugal force becomes large in the case of heavy tools and increases the chance of falling of heavy tools.

To preclude these drawbacks, in another known machine tool, a large tool rack for storing a number of large diameter tools is provided on a table, and a tool change operation is effected utilizing feed movements of the table. However, the provision of the large tool rack on the table causes the machine tool to have the following drawbacks.

(1) The working space on the table is diminished.

(2) The number of large diameter tools storable in the rack is limited to only a few.

(3) Cutting chips are scattered to adhere to the stored large diameter tools, which raises a problem in inserting each large diameter tool into the tool spindle.

SUMMARY OF THE INVENTION

Accordingly, it is a primary object of the present invention to provide an improved machine tool wherein the foregoing drawbacks are precluded by providing the machine tool with a tool change apparatus for large diameter tools, in addition to another tool change apparatus for small diameter tools.

Another object of the present invention is to provide an improved machine tool having a tool change apparatus which is composed of a tool magazine capable of reliably storing a plurality of large diameter tools and a tool transfer device capable of transferring the large diameter tools between the tool magazine and a tool spindle of the machine tool.

A further object of the present invention is to provide an improved machine tool of the character set forth above wherein a tool magazine for large diameter tools does not diminish the working space on a work table of the machine tool and wherein the large diameter tools stored in the tool magazine are free from pollution by cutting chips.

Briefly, according to the present invention, there is provided a machine tool comprising a spindle head mounted on a machine frame, a horizontal tool spindle rotatably mounted in the spindle head, a first tool storage device for removably storing a plurality of small diameter tools, and a first tool transfer device for transferring the small diameter tools between the first tool storage device and the tool spindle. A second tool storage device is installed independently of the machine frame and stores a plurality of large diameter tools, with the axes of the large diameter tools extending vertically. The second tool storage device is capable of horizontally moving the large diameter tools so as to index one of the large diameter tools to a large tool removal position and is also capable of pivotally moving between vertical and horizontal positions one of the large diameter tools indexed to the large tool removal position. A second tool transfer device is further provided, which is linearly movable to transfer a new large diameter tool from the large tool removal position to the tool spindle and to transfer a used large diameter tool from the tool spindle to the large tool removal position.

With this configuration, because the large diameter tools in the second tool magazine are stored with their axes extending vertically, they are reliably prevented from falling off the second tool magazine. Further, the tool transfer device is linearly moved when transferring the large diameter tools between the second tool magazine and the tool spindle, a centrifugal force being prevented from acting upon each large tool during transfer movement, so that the large diameter tools can be transferred reliably without falling off the second transfer device.

In another aspect of the present invention, the second tool transfer device is composed of a tool support having first and second tool grippers each capable of gripping the large diameter tool. The first and second tool grippers are spaced in a first horizontal direction perpendicular to the axis of the tool spindle. The tool support is movable in the first horizontal direction to selectively bring the first and second tool grippers into axial alignment with the tool spindle. Thus, when the tool support is before the tool spindle, one of the tool grippers is able to remove a used large tool from the tool spindle and the other tool gripper is then able to insert a new large diameter tool into the tool spindle. This makes it possible that the tool support inserts the new large diameter tool into the tool spindle and returns the used tool to the second tool storage device through one reciprocative movement between the second tool storage device and the tool spindle.

BRIEF DESCRIPTION OF THE DRAWINGS

The foregoing and other objects and many of the attendant advantages of the present invention will be readily appreciated as the same becomes better understood from the following detailed description of a preferred embodiment when considered in connection with the accompanying drawings, wherein like reference numerals designate identical or corresponding parts throughout the several views, and in which:

FIG. 1 is a side elevational view of a machine tool according to the present invention;

FIG. 9 is a side elevational view of the large tool transfer apparatus.

DESCRIPTION OF THE PREFERRED EMBODIMENT

Figure 2:
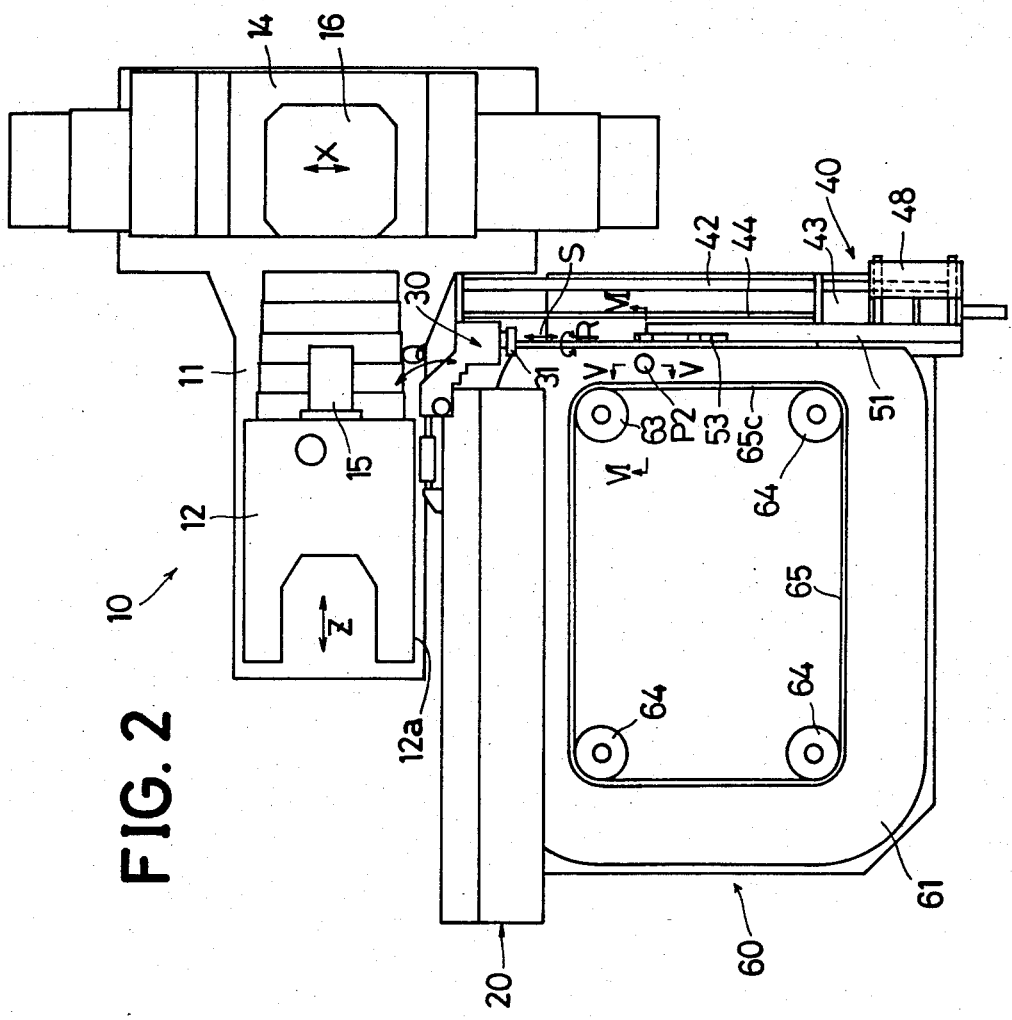
FIG. 2 is a plan view of the machine tool.
Figure 3:
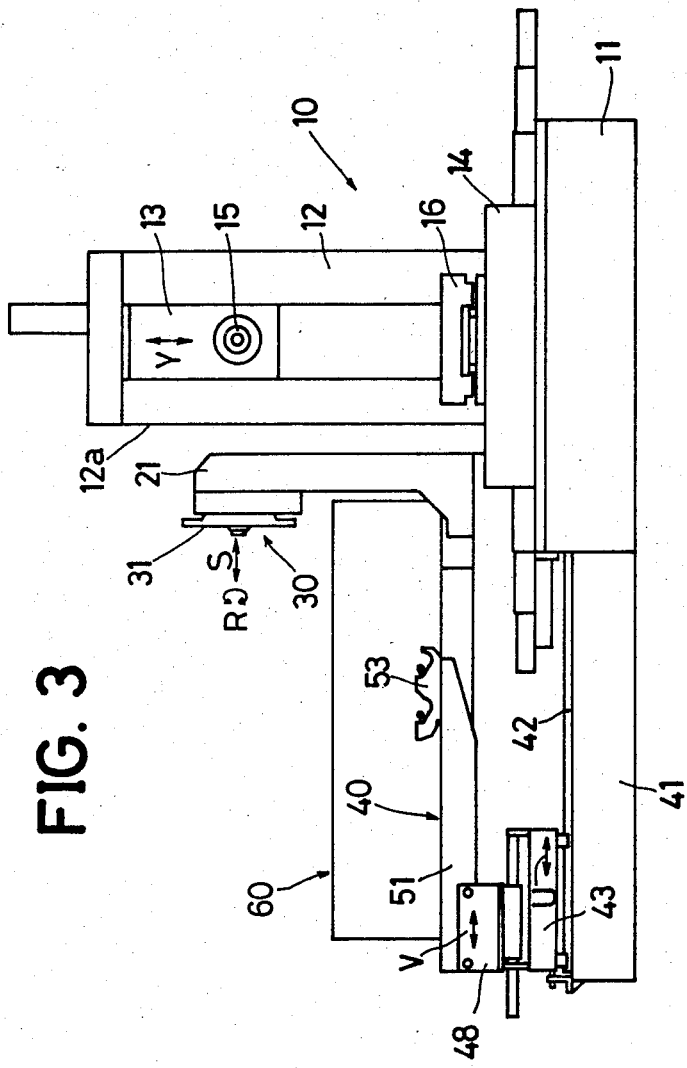
FIG. 3 is a front view of the machine tool.

Referring now to the drawings and particularly to FIGS. 1 through 3 thereof, a machine tool 10 according to the present invention is shown having a column 12, at one side of which is provided a first tool magazine 20 for removably storing a plurality of small diameter tools. The first tool magazine 20 is operable in response to a control signal to indexably present a desired small diameter tool to a small tool removal position P1. A tool exchange unit 30 exchanges the desired small diameter tool with a used small diameter tool being received in a tool spindle 15. The exchange unit 30 includes an exchange arm 31, which is pivotable about a horizontal axis and which is movable along the horizontal axis. Opposite ends of the exchange arm 31 are designed to grip two small diameter tools at a time. The exchange unit 30 is horizontally pivotable through 90-degrees as indicated by the arrow Q in FIG. 2 for effecting a tool exchange operation. The tool exchange apparatus as constructed above is well known in the art.

Figure 7:
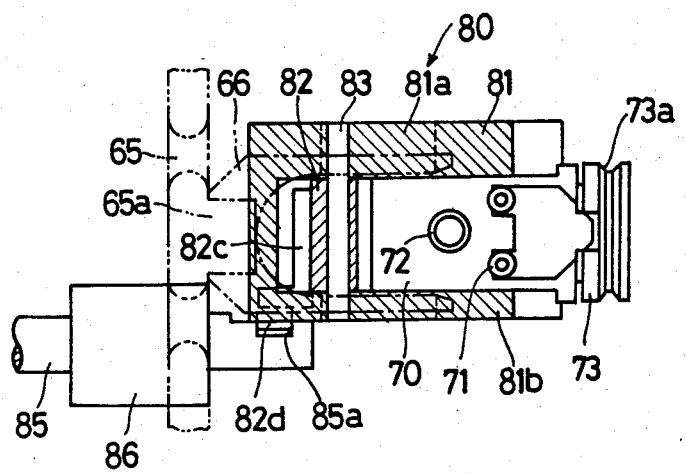
FIG. 7 is a fragmentary sectional view of the machine tool taken along the line VII—VII in FIG. 6.
Figure 8:
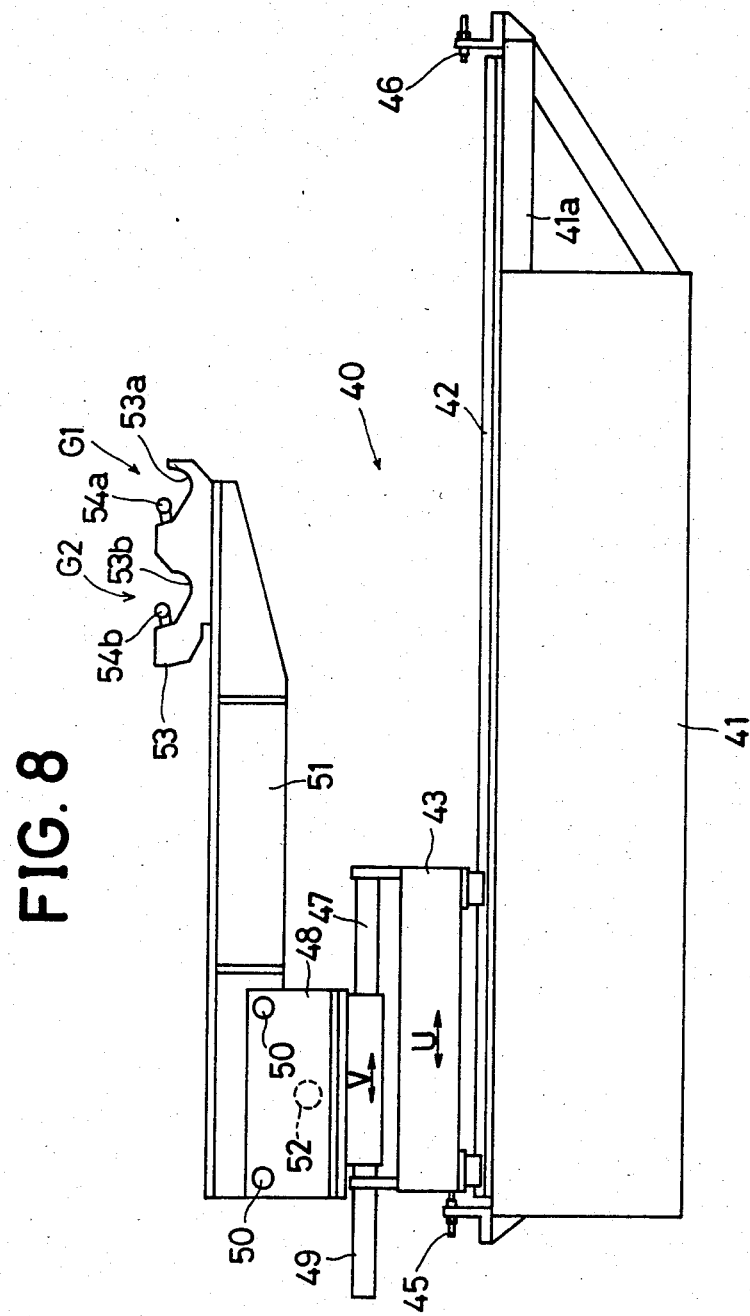
FIG. 8 is a front view of a large tool transfer apparatus incorporated in the machine tool.

The machine tool according to the present invention is further provided with another tool change apparatus as constructed below. A second tool magazine 60 for removably storing a plurality of large diameter tools is installed on the floor in the vicinity of the first tool magazine 20. The second tool magazine 60 is operable to index a desired large diameter tool to a large tool removal position P1 in response to a control signal. To be stored stably, each of the large diameter tools in the second tool magazine 60 is held with its axis extending vertically, and at the large tool removal position P2 is pivotable by a turnover mechanism shown in FIGS. 5-7 in detail, to have its axis parallel to the tool spindle 15. A tool transfer device 40 whose detail is shown in FIGS. 8 and 9 is provided to carry by a tool support thereof the large diameter tool when the same is so pivoted at the large tool removal position P2. The tool transfer device 40 is operable to remove the large diameter tool from a pivoted large tool socket 70 by moving the tool in a W-direction as shown in FIG. 9, to transfer the tool to a position where the tool faces the spindle head 13 and to change the tool with another large diameter tool being received in the tool spindle 15 by effecting a shifting motion in a V-direction shown in FIG. 8 and attaching and removal motions in the direction W in connection with upward and downward movements of the spindle head 13. The tool transfer device 40 is also operable to return the removed large diameter tool to the large tool removal position P2.

The embodiment of the present invention is of the general construction as described above and will be described hereafter in more detail.

As illustrated in FIGS. 1-3, the column 12 is mounted on a frame or bed 10 of the machine tool 11 for movement in a front-rear direction indicated by the arrow Z. The tool exchange unit 30 for small diameter tools is provided with the exchange arm 31 which as indicated by the arrow R, is rotatable about a horizontal axis and which is extensible and retractable along the horizontal axis as indicated by the arrow S. The unit 30 is carried by a magazine base 21 which is mounted on a later-described magazine base 61 of the second tool magazine 60, and is horizontally pivotable about a vertical pivot shaft 32.

Figure 4:
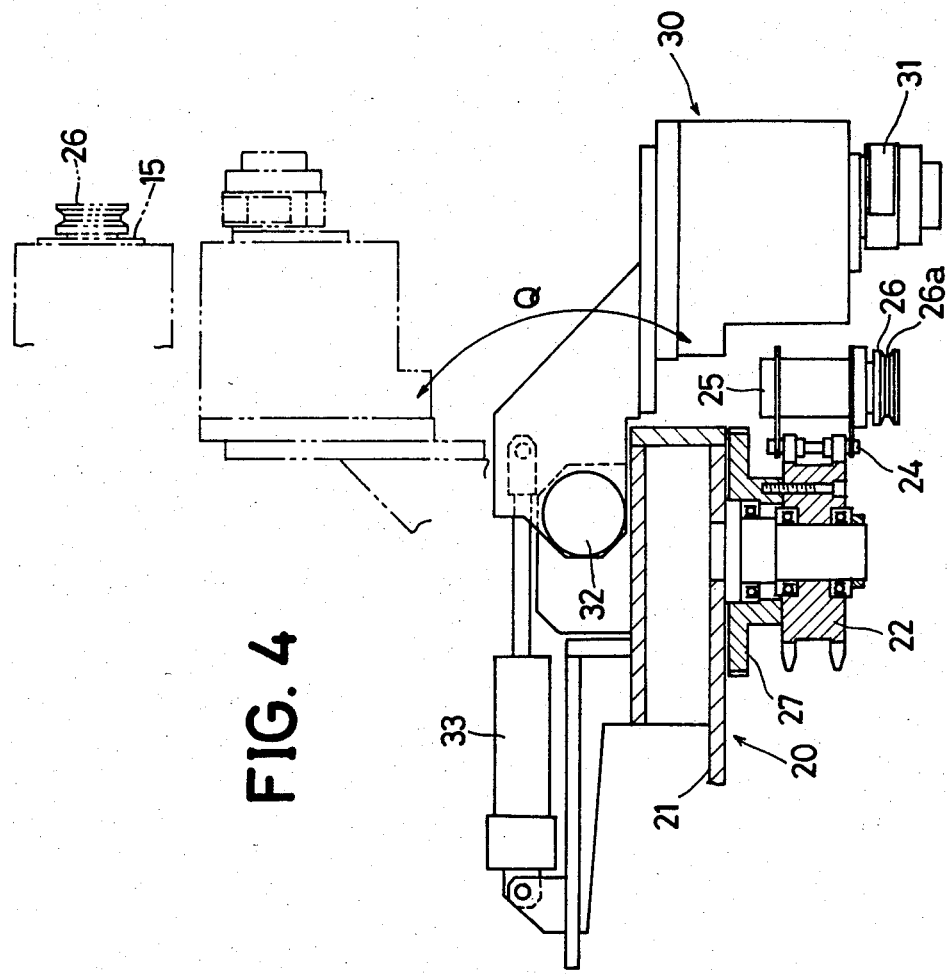
FIG. 4 is a fragmentary sectional view of the machine tool taken along the line IV—IV in FIG. 1.

The unit 30, when at a home position indicated by the solid line in FIG. 4, rotates the exchange arm 31 to grip by its one gripper finger 31a (FIG. 1) an annular groove 26a of a small diameter tool holder 26 positioned at the small tool removal position P1 and then axially extends the exchange arm 31 to remove the tool holder 26 with a desired tool from the tool socket 25. Subsequently, a unit pivot cylinder 33 is then operated to pivot the exchange unit 30 through 90-degrees as indicated by the arrow Q shown in FIG. 4 and to stop the exchange unit 30 at a position indicated by the phantom line. The exchange unit 30 at this position causes the tool exchange arm 31 to effect combined operations of rotation, extension and retraction of the exchange arm 31, whereby a tool holder 26 with a used tool is removed from the tool spindle 15 and the tool holder 26 with a desired tool is inserted into the tool spindle 15. The tool exchange unit 30 is then returned to the home or solid line position shown in FIG. 4 through the 90-degree rotation and causes the exchange arm 31 to insert the removed tool holder 26 into a tool socket 25. The tool socket 25 into which the removed tool holder 26 is inserted may be a tool socket in which the desired tool holder 26 was stored or may be another tool socket.

As best shown in FIG. 2, the second tool magazine 60 for large diameter tools is installed on the floor at the same side as the first tool magazine 20 with respect to the column 12. One drive sprocket 63 and three driven sprockets 64 are respectively supported at four corner portions of a magazine base 61 of the second tool magazine 60 for rotations about respective vertical axes. An endless second magazine chain 65 is wound around these sprockets 63, 64 to be moved in a horizontal plane. One of four sides of the magazine chain 65c extends in a direction perpendicular to the tool spindle 15 and approximately in alignment with one or front end of the first tool magazine 20 where the tool exchange unit 30 is provided.

Figure 5:
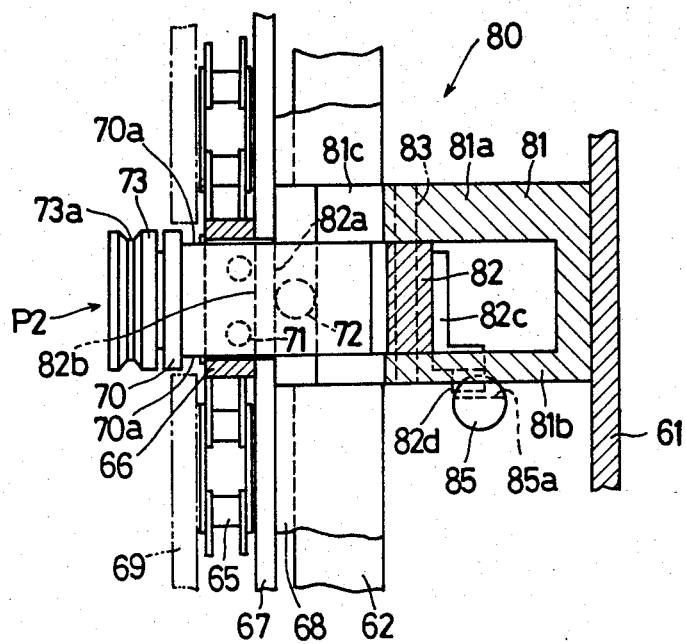
FIG. 5 is a fragmentary sectional view of the machine tool taken along the line V—V in FIG. 2.
Figure 6:
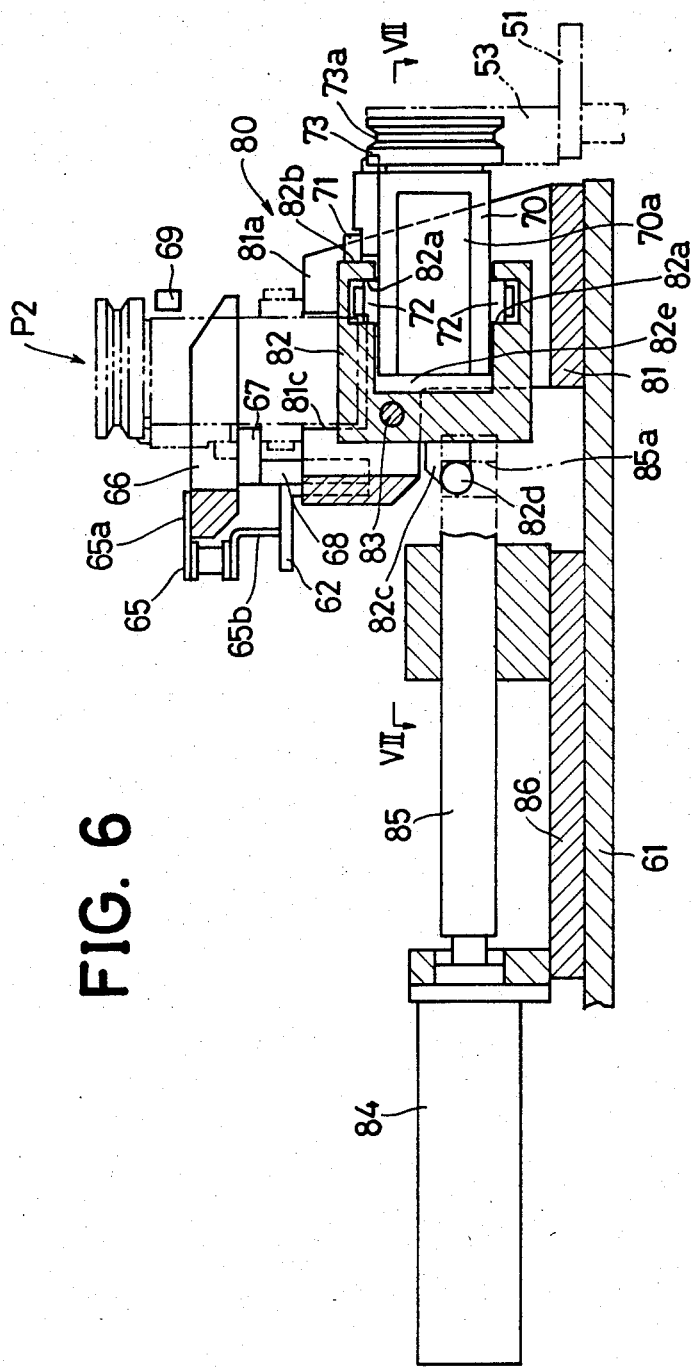
FIG. 6 is a fragmentary sectional view of the machine tool taken along the line VI—VI in FIG. 2.

As shown in FIGS. 5 and 6, the second magazine base or frame 61 has fixed thereon a second magazine frame 62, which horizontally extends under and along the second magazine chain 65. A guide rail 67 which horizontally extends along the external surface of the second magazine frame 62 is secured to the second magazine frame 62 through a rail support plate 68 at the same height as the lower surface of the second magazine chain 65. The second magazine chain 65 is composed of a plurality of pairs of upper and lower links 65a, 65b which are provided at predetermined intervals. Each upper link 65a has an outwardly extending horizontal portion, while each lower link 65b has a downwardly extending portion. A holding member 66 of a horseshoe shape is secured to the outwardly extending horizontal portion of each upper link 65a, with its opening portion being directed horizontally outwardly. When the second magazine chain 65 is circulated, the depending portion of each lower link 65b slides on the second magazine frame 62, whereas the holding member 66 is slidden on the guide rail 67.

Each large tool socket 70 for receiving therein a large diameter tool 73 is normally held by the holding member 66 at diametrically opposite flat surfaces 70a formed thereon in the moving direction of the second magazine chain 65 and is moved together with the second magazine chain 65, with its axis extending vertically. As shown in FIGS. 5 and 7, each large tool socket 70 rotatably carries a first pair of rollers 71 at one side thereof which is in a direction parallel to the flat surfaces 70a. The rollers 71 are spaced in a horizontal direction which is perpendicular to the flat surfaces 70a. Each large tool socket 70 also rotatably carries a second pair of rollers 72 rotatable about a common axis at both sides thereof which extends in a direction parallel to the flat surfaces 70a. Thus, each large tool socket 70 is supported by the guide rail 67 through the rollers 71 which roll on the guide rail 67. The guide rail 67 is sandwiched by the first rollers 71 and one of the second rollers 72 which is located at same side as the first rollers 71, and this prevents vertical movement of each large tool socket 70. A guide rail 69 is further provided in parallel relation with the guide rail 67 for slidable engagement with the other side of each large tool socket 70, and this ensures that each large tool socket 70 is moved along the parallelly extending guide rails 67 and 69.

The drive sprocket 63 is driven by a second magazine drive motor (not shown) and indexes in response to a control signal a desired one of large tool sockets 70 each receiving a large diameter tool to the large tool removal position P2 which is located at the above-noted one side 65c of the second magazine chain 65. It is to be noted herein that each large tool holder 73 and each small tool holder 26 have their tapered shank portions identical with each other, so that they are selectively receivable in the tool spindle 15.

At the large tool removal position P2, as shown in FIGS. 5-7, the second magazine frame 62 and the guide rails 67, 69 are discontinued, and the turnover device 80 is installed within the discontinued space. A frame 81 of the turnover device 80 is fixed on the second magazine base 61 and has a pair of vertical walls 81a, 81b extending parallel to the tool spindle 15. The vertical walls 81a, 81b support a pin 83, which horizontally extends in a direction parallel to the tool spindle 15. This pin 83 carries a turnover head 82 for pivotal movement thereabout. A bracket 86 fixed on the second magazine base 61 mounts a position control cyliner 84 and slidably guides an operating rod 85 axially movable by the cylinder 84. The operating rod 85 is formed at its front end with a vertically extending engaging groove 85a. This groove 85a receives therein an engaging roller 82d, which is carried by a roller holder 82c secured to the turnover head 82. The cylinder 84 is operable to pivot the turnover head 82 between a vertical position to hold a large tool socket 70 vertically as indicated by the phantom line in FIG. 6 and a horizontal position as indicated by the solid line. The turnover head 82 is formed with a channel 82e, which permits each large tool socket 70 held vertically to pass across the turnover head 82. The channel 82e includes a pair of grooves 82a, which permit the second rollers 72, 72 of each large tool socket 70 to pass thereacross. Each of the vertical walls 81a, 81b of the frame 81 is formed with a cutout 81c, which opens to the channel 82e when the turnover head 82 is in the vertical position.

With the turnover head 82 being held in the vertical position, the circulation of the second magazine chain 65 causes the lower half of each large tool socket 70 to pass through the cutout 81c and the channel 82e, the holding member 66 and the first rollers 71, 71 to pass over an upper end surface 82b of the turnover head 82, and the second rollers 72, 72 to pass through the grooves 82a, 82a. Each large tool socket 70, when indexed to the large tool removal position P2, is stopped with the lower half thereof being located within the channel 82e and with the second rollers 72, 72 being located within the grooves 82a, 82a. When the turnover head 82 is then pivoted to the horizontal position as indicated by the solid line in FIG. 6, the large tool socket 70 is held parallel with the tool spindle 15, and the annular groove 73a of a large tool holder 73 received in the large tool socket 70 is brought into support by a semicircular opening 53a of a tool support 53 which will be described later. The large tool socket 70 which has now fallen down is prevented by the rollers 72, 72 engaging the grooves 82a, 82a from axially moving and is also prevented by the frame 81 and the turnover head 82 from radially moving.

Description will now be made with respect to the tool transfer device 40 which changes a large diameter tool holder 73 being recieved in the fallen-down tool socket 70 with another large diameter tool holder 73 being received in the tool spindle 15. Referring now to FIGS. 1-3, a fixed base 41 having an extension 41a (FIG. 8) bodily secured thereto is installed on the floor alongside the front side of the second magazine base 61. A pair of guide ways 42, 42 for linear motion are secured to the upper surface of the fixed base 41, and a carrier 43 is guided by the guide ways 42, 42 for sliding movement in a horizontal direction transverse to the tool spindle 15. As shown in FIGS. 8 and 9, the carrier 43 is movable by a feed screw 44, which is rotatable by a drive motor (not shown). Stroke ends of the carrier 43 in the horizontal direction are determined by stoppers 45, 46, which are adjustably provided at opposite ends of the fixed base 41.

The carrier 43 is provided thereon with a pair of pilot bars 47, 47 extending in parallel relation with the guide ways 42, 42, and a shiftable head 48 is slidably guided by the pilot bars 47, 47. A pair of extensible rods 50, 50 are guided by the shiftable head 48 for sliding movement in a W-direction parallel to the tool spindle 15 and has secured to their ends an arm 51, which extends towards the spindle head 13 in parallel to the guide ways 42, 42. A tool support 53 secured to one end of the arm 51 is formed with a pair of tool grip portions G1 and G2 spaced in the V-direction. The tool grip portions G1, G2 include semicircular openings 53a, 53b each engageable with the annular groove 73a of the large tool holder 73 and spring-biased plungers 54a, 54b each for preventing the tool holder 73 from disengaging from the semicircular opending 53a or 53b. The arm 51 is movable by a cylinder 52 relative to the shiftable head 48 in the W-direction for inserting a large tool holder 73 into, and removing it from, each of the tool spindle 15 and the large tool socket 70 held horizontally at the large tool removal position P2. The shiftable head 48 is movable by a shifting cylinder 49 relative to the carrier 43 in the V-direction, and the movable stroke of the shiftable head 48 coincides with the distance between the two tool grip portions G1 and G2. The stroke of the carrier 43 movable by the feed screw 44 in the U-direction is the horizontal distance between the axis of the tool spindle 15 and the center of the large tool removal position P2.

When the tool transfer device 40 as constructed above is at a stand-by position as shown in FIGS. 2, 3 and 8 and when the large tool socket 70 has fallen down at the large tool removal position P2, the large tool holder 73 received in the tool socket 70 is carried at its annular groove 73 in the semicircular opening 53a of the tool support 53 and is gripped by the plunger 54a. The tool support 53 is then retracted by the attaching cylinder 52 toward the right as viewed in FIGS. 2 and 9, whereby the large tool holder 73 is removed from the large tool socket 70. Subsequently, the carrier 43 is moved by the feed screw 44 toward the right as viewed in FIGS. 3 and 8, and the shiftable head 48 is also moved by the shifting cylinder 49 toward the right. Thus, the tool grip portion G2 is placed to be aligned with a vertical plane including the axis of the tool spindle 15. It is assumed herein that the column 12 is already at its predetermined large tool change position in a Z-direction and that the spindle head 13 is already at a higher position than its predetermined large tool change position. In this state, the attaching cylinder 52 is operated to advance the tool support 53 in the W-direction, whereafter the spindle head 13 is lowered to the predetermined large tool change position. This causes the annular groove 73a of a used large tool holder 73 to be carried in the semicircular opening 53b of the tool support 53 and to be arrested by the plunger 54b.

The tool support 53 is then retracted by the attaching cylinder 52 toward the right as viewed in FIGS. 2 and 9 so as to remove the used large tool holder 73 from the tool spindle 15. The shiftable head 48 is retracted by the shifting cylinder 49 to bring the large tool holder 73 gripped by the tool grip portion G1 into axial alignment with the tool spindle 15. The tool support 53 is then advanced by the attaching cylinder 52, and this causes the large tool holder 73 held by the tool grip portion G1 to be inserted into the tool spindle 15. The large tool holder 73 now in the tool spindle 15 is removed from the tool grip portion G1 by subsequently effecting the upward movement of the spindle head 13. Thereafter, the carrier 43 is moved so that the used large tool holder 73 is returned to the second tool magazine 60 at the large tool removal position P2, whereupon the large tool exchange operation is completed. The large tool socket 70 to which the used large tool holder 73 is returned may be one in which the large tool holder 73 now in the tool spindle 15 was stored or may be another large tool socket 70 of the second tool magazine 60.

It is apparent that a tool change operation can be performed between large and small diameter tools. That is, when a small diameter tool is to be used after a large diameter tool, the tool transfer device 40 is first operated to remove the large diameter tool from the tool spindle 15, and the tool exchange unit 30 is then operated to insert the small diameter tool into the tool spindle 15. Conversely, when a large diameter tool is to be used after a small diameter tool, the tool exchange unit 30 is first operated and the tool transfer device 40 is then operated.

Although in the above-described embodiment, the tool support 53 is movable in a direction parallel to the tool spindle 15 for removing a large diameter tool from, and inserting it into, each of the tool spindle 15 and the large tool socket 70 of the second tool magazine 60, such movement of the tool support 53 is not essential. Tool transfer between the tool support 53 and each of the tool spindle 15 and the large tool socket 17 in the axial direction of the tool spindle 15 may be realized by moving the tool spindle 15 and the second tool magazine 60 in the axial direction of the tool spindle 15.

Obviously, various modifications and variations of the present invention are possible in light of the above teachings. It is therefore to be understood that within the scope of the appended claims, the present invention may be practiced otherwise than as specifically described herein.

What is claimed is:

1. A machine tool comprising: a machine frame;
   a spindle head vertically movably supported on said machine frame;
   a tool spindle carried by said spindle head for rotation about a horizontal axis;
   first small tool storage means for removably storing a plurality of tools;
   pivotable tool exchange means for changing said tools between said tool spindle and said first small tool storage means;
   second large tool storage means positioned separate from said first tool storage means for removably storing a plurality of tools, said second tool storage means being capable of moving said tools stored therein so as to index one of said tools to a tool removal position; and
   tool transfer means for transferring said tool from said tool removal position of said second tool storage means so as to insert it into said tool spindle and for transferring an additional tool from said tool spindle so as to store said additional tool into said second tool storage means at said tool removal position wherein
   said tools stored in the first small tool storage means comprise a plurality of small diameter tools, while said tools stored in the second large tool storage means comprise a plurality of large diameter tools;
   said first tool storage means comprises means for horizontally storing said small diameter tools, while said second tool storage means comprises means for vertically storing said large diameter tools; and
   said second large tool storage means further comprises means for horizontally moving said large diameter tools, with the axes of said large diameter tools extending vertically, so as to index one of said large diameter tools to said tool removal position and for pivotally moving between vertical and horizontal positions one of said large diameter tools indexed to said tool removal position.

2. A machine tool as set forth in claim 1, wherein:
   said tool transfer means is operable to transfer said large diameter tools between said tool removal position of said second tool storage means and said tool spindle, with the axes of the same extending horizontally.

3. A machine tool as set forth in claim 2, wherein said second tool storage means comprises:
   a magazine frame;
   a guide rail horizontally extending on said magazine frame;
   a plurality of tool sockets for removably storing said large diameter tools, said tool sockets being movable along said guide rail, with axes thereof extending vertically;

indexing means for moving said tool sockets along said guide rail so as to index one of said tool sockets to said tool removal position;

a turnover head provided at said tool removal position and pivotable between vertical and horizontal positions, said turnover head constituting a part of said guide rail for permitting said tool sockets to successively pass thereacross when located at said vertical position; and pivot drive means for pivotally moving said turnover head between said vertical and horizontal positions.

4. A machine tool as set forth in claim 3, wherein said turnover head presents one of said tool sockets in parallel relation with said tool spindle when pivoted by said pivot drive means to said horizontal position, and wherein said tool transfer means comprises:

a tool support having first and second tool grippers each for receiving one of said large diameter tools, said first and second tool grippers being spaced in a first horizontal direction perpendicular to the axis of said tool spindle;

first feed means for feeding said tool support in said first horizontal direction so as to selectively bring said first and second tool grippers into axial alignment with any of said tool sockets horizontally held at said tool removal position and said tool spindle; and second feed means for feeding said tool support in a second horizontal direction perpendicular to said first horizontal direction so as to enable said first tool gripper to receive a new large diameter tool from one of said tool sockets horizontally held at said tool removal position and insert said new large diameter tool into said tool spindle and so as to enable said second tool gripper to receive a used large diameter tool from said tool spindle and insert said used large diameter tool into one of said tool sockets horizontally held at said tool removal position.

5. A machine tool as set forth in claim 4, wherein said first feed means comprises:

a carrier movable in said first horizontal direction;

a shiftable head mounted on said carrier and movable relative thereto in said first horizontal direction, said shiftable head carrying said tool support thereon;

carrier feed means for moving said carrier in said first horizontal direction so as to present said tool support selectively before said one of said tool sockets horizontally held at said tool removal position and said tool spindle; and shiftable head feed means mounted on said carrier for moving said shiftable head relative to said carrier in said first horizontal direction so as to selectively bring said first and second tool grippers into axial alignment with said one of said tool sockets horizontally held at said tool removal position and so as to selectively bring said first and second tool grippers into axial alignment with said tool spindle.

* * * * *